Figure 1:
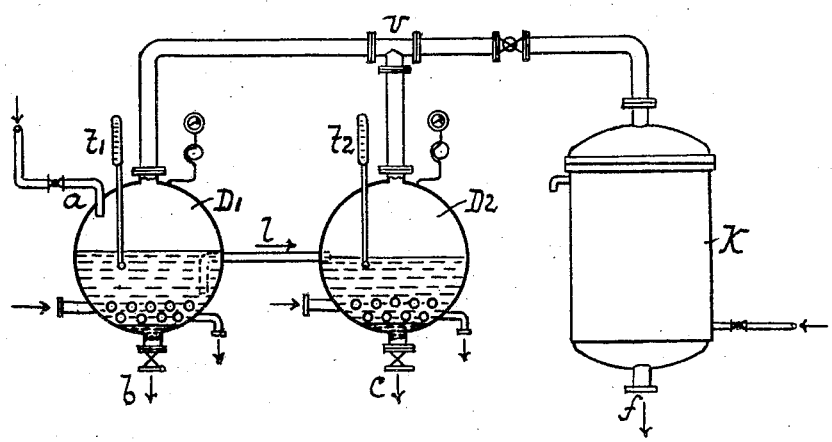

July 28, 1931.   P. KOPPE   1,816,084
PRODUCTION OF PURE SULPHUR
Filed Aug. 8, 1929   2 Sheets-Sheet 1

Inventor
Paul Koppe
By his Attorneys Hauff-Ebarant

July 28, 1931. P. KOPPE 1,816,084
PRODUCTION OF PURE SULPHUR
Filed Aug. 8, 1929 2 Sheets-Sheet 2

Inventor
Paul Koppe
By his Attorneys Hauff & Harland

Patented July 28, 1931

1,816,084

UNITED STATES PATENT OFFICE

PAUL KOPPE, OF NEUROESSEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF PURE SULPHUR

Application filed August 8, 1929, Serial No. 384,485, and in Germany September 22, 1928.

The present invention relates to the production of pure sulphur from polysulphide solutions.

A process for the continuous production of sulphur from solutions of ammonium polysulphides has been described elsewhere, by which these solutions are introduced into a liquid in a closed vessel, the said liquid being maintained at atmospheric or elevated pressure and at a temperature which lies above the melting point of sulphur. A modification of this process is also known according to which the solutions of polysuphides are treated with direct steam in a counter current in a separating column at a temperature which lies above the melting point of sulphur so that the sulphur separates out. The essential feature of the aforesaid and similar processes resides in the polysulphide solutions being decomposed at a temperature above the melting point of the sulphur, and my invention relates more particularly to improvements in processes involving this essential feature.

The sulphur of a purity of from 99.98 to 99.99 per cent obtainable according to these processes is certainly very pure in comparison with the ordinary commercial broken sulphur which originates from America or Sicily; in the solid state, however, it has a greenish or gray green colouration which reduces its selling value and is due to inorganic impurities, probably chiefly iron sulphide and other dark coloured metal sulphides which pass over into the sulphur from the solutions of polysulphides first obtained in the recovery of sulphur from masses containing the same by means of ammonium sulphides. In consequence of the fine dispersion of the impurities the purification of sulphur containing such impurities is very difficult and necessitates an expenditure in chemicals and labour which renders the process expensive.

I have now found that sulphur which fulfils all requirements as regards purity can be obtained in a simple manner by the processes hereinbefore referred to, by carrying out the separation of the sulphur from solutions of polysulphides in stages.

By the gradual decomposition of a solution of ammonium polysulphides which is apparently clear, but which contains impurities of the kind already described in colloidal solution, a perfectly pure sulphur can be attained at first and this sulphur satisfies all requirements as regards appearance, and purity by analysis. In consequence of the presence of ammonia and ammonium sulphide the impurities at first remain colloidally dissolved in the solution of polysulphides. The substances which give the sulphur the undesirable colouration separate out only towards the end of the decomposition of the ammonium polysulphides.

The nature of my invention will be further described with reference to the accompanying diagrammatic drawings which show the arrangements of apparatus in accordance with this invention. In Figure 1 the decomposition of the solution of polysulphides is effected by indirect heating and in Figure 2 it is effected by direct heating by means of steam in counter current, but the invention is not restricted to the arrangements shown in the drawings.

Figure 1 shows in section an arrangement of apparatus according to this invention in which $D_1$ and $D_2$ are two pressure tight vessels connected with each other by a pipe $l$, in which vessels coils of pipes which are to be heated by steam are arranged for the purpose of indirectly heating the liquid contents of the vessels. The solution of polysulphides to be decomposed is continuously introduced under pressure at $a$ in a quantity equal to that of the products formed by the decomposition of the solution of polysulphides, namely, ammonia, hydrogen sulphide and steam, which leave the vessels $D_1$ and $D_2$ through a pressure valve $v$ which maintains a pressure for example of from 1.5 to 2 atmospheres in the pressure tight vessels and run into a condenser $K$. The condensate, namely a solution of pure ammonium sulphide, runs off from the condenser $K$ at $f$. The solution can then be employed again for the extraction of crude sulphur or materials containing free sulphur.

By alteration of the quantity of the inflowing solution of polysulphides and of the hot steam it is possible to regulate the temperatures in the pressure tight vessels, which may be read by means of thermometers $t_1$ and $t_2$, so that a temperature prevails in $D_1$ which is still above the melting point of sulphur but which is below the boiling point of pure water at the pressure prevailing in $D_1$. For example, the quantity of the solution of polysulphides flowing in and the quantity of the hot steam may be regulated so that the temperature in $D_1$ amounts to about 118° centigrade. Under these conditions the separation of the sulphur in the pressure tight vessel $D_1$ continuously occurs in the presence of so much ammonium sulphide that the impurities remain in solution. The impurities, together with the undecomposed solution, are continuously led into $D_2$ by means of the pipe $l$, in which latter vessel the complete decomposition occurs at a higher temperature, for example at from about 125° to 127° centigrade. Very pure yellow sulphur continuously separates out in $D_1$, and is drawn off continuously or periodically at $b$, whilst the sulphur which is drawn off from $D_2$ at $c$ is less pure and is considerably coloured by the impurities which it has taken up.

Obviously a single pressure tight vessel is sufficient instead of two, if the introduction of the solution of polysulphides and the decomposition of the same are carried out periodically and not continuously. In the first part of the decomposition from about 60 to 90 per cent of the total sulphur obtainable can be recovered in a very pure state; after drawing off this quantity of sulphur the residual solution is worked up until it is completely decomposed. After drawing off the remaining quantity of sulphur the whole of the aqueous residual liquid is removed from the pressure tight vessel, which may then be charged with a fresh quantity of a solution of polysulphides. By this manner of working, the great advantage of the continuous process and the uniform charging and especially of the condensation plant, is dispensed with, but the process may be carried out in a simpler and cheaper apparatus.

Figure 2:
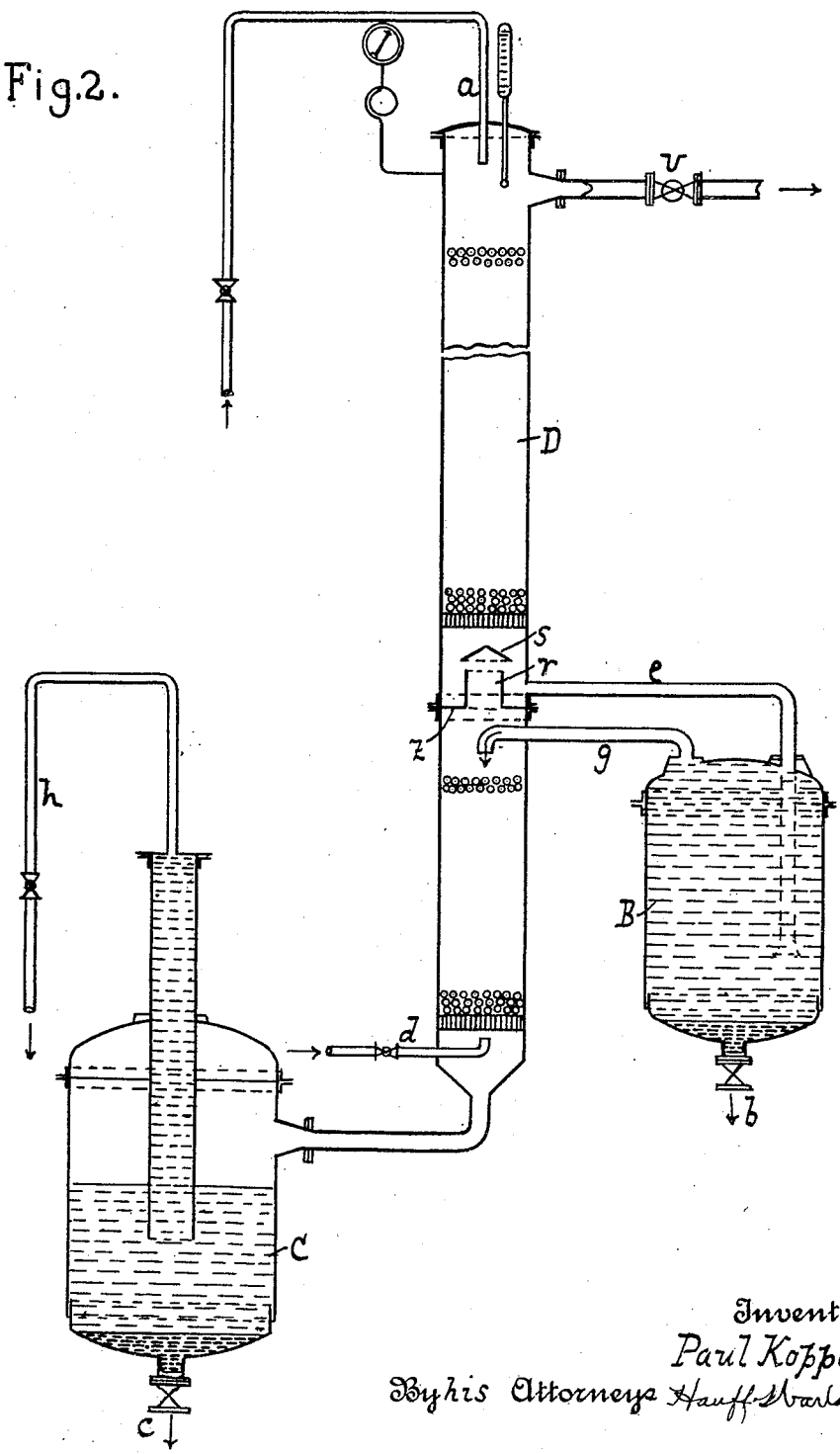

When it is desired to recover large quantities of sulphur continuously with the expenditure of the least possible quantity of steam it is advantageous to employ the arrangement of apparatus in accordance with this invention shown in section in Figure 2.

A separating column D, which contains fillers of any kind having the greatest and smoothest possible surface, is divided into two chambers by an intermediate floor $z$ which is provided with a pipe $r$ and a hood $s$ above the said pipe $r$, the said pipe providing an opening for the vapours rising from below, such as the steam introduced into the column at $d$. The solution of ammonium polysulphides is continuously introduced under pressure into the upper chamber at $a$, and is decomposed to a great extent by the steam which is flowing in counter-current. The ammonium sulphide vapour thus formed streams from the top of the column into a condenser through a pressure valve $v$. The mixture of still undecomposed solution of polysulphides and the sulphur which has already separated out, which is trickling through the upper chamber is trapped at $z$ and flows through a tube $e$ into a reservoir B. The sulphur settles to the bottom of the reservoir B in the molten state, and may be drawn off at $b$ in a very pure form. The quantity of this sulphur amounts to 90 per cent or more of the quantity of sulphur, contained in the solution of polysulphides above the amount of sulphur bound in the form of ammonium sulphide. It is equal in value to Sicilian roll sulphur in every respect.

The solution which is supernatant to the sulphur in the reservoir B again flows into the column D through a tube $g$, this time into the lower chamber thereof, and is there completely decomposed. The water free from ammonium sulphide, together with the remainder of the sulphur, flows into a reservoir C at the foot of the column D. From this reservoir C, the sulphur is removed at $c$, and the water at $h$. This sulphur which contains the impurities, resembles commercial American broken sulphur, especially as regards its colour, but the degree of purity of the former, determined by analysis, is considerably higher than that of the latter.

What I claim is:

1. In the production of sulphur by decomposition of a polysulphide solution at a temperature above the melting point of sulphur, the step of effecting the separation of sulphur in stages.

2. The process of producing sulphur, which comprises contacting a polysulphide solution with steam at a temperature above the melting point of sulphur, thereby decomposing part of the polysulphide, separating the sulphur formed, and again treating the remaining solution with steam at a temperature above the melting point of sulphur.

3. The process of producing sulphur, which comprises contacting a polysulphide solution with steam at a temperature slightly above the melting point of sulphur, thereby decomposing part of the polysulphide, separating the sulphur formed, and again treating the remaining solution with steam at a higher temperature.

4. In the production of sulphur by decomposition of an ammonium polysulphide solution at a temperature above the melting point of sulphur, the step of effecting the separation of sulphur in stages.

5. The process of producing sulphur, which comprises contacting an ammonium polysulphide solution with steam at a temperature above the melting point of sulphur, thereby decomposing part of the polysulphide, separating the sulphur formed, and again treating the remaining solution with steam at a temperature above the melting point of sulphur.

6. The process of producing sulphur, which comprises contacting an ammonium polysulphide solution with steam at a temperature slightly above the melting point of sulphur, thereby decomposing part of the polysulphide, separating the sulphur formed, and again treating the remaining solution with steam at a higher temperature.

7. The process of producing sulphur from an ammonium polysulphide solution containing inorganic impurities which comprises carrying out the process in two stages and effecting a partial decomposition in the first stage under a temperature slightly in excess of the melting point of sulphur so that an excess of sulphide is present to thereby retain said inorganic impurities in solution, separating the sulphur formed in this stage and completely decomposing the solution in the second stage.

8. The process of producing sulphur from an ammonium polysulphide solution which comprises passing the polysulphide solution counter current to a stream of steam under pressure and a temperature slightly in excess of the melting point of sulphur to effect a partial decomposition of said solution to sulphur and sulphide, tapping off said sulphur and treating the remaining solution with steam at a higher temperature.

In testimony whereof I have hereunto set my hand.

PAUL KOPPE.